United States Patent

Barsotti et al.

[11] Patent Number: 5,827,910
[45] Date of Patent: Oct. 27, 1998

[54] MAR-RESISTANT COATING

[75] Inventors: Robert J. Barsotti, Franklinville, N.J.; J. David Nordstrom, Detroit, Mich.

[73] Assignee: E. I. du Pont de Nemours and Company, Wilmington, Del.

[21] Appl. No.: 666,486

[22] PCT Filed: Dec. 21, 1994

[86] PCT No.: PCT/US94/14240

§ 371 Date: Jun. 26, 1996

§ 102(e) Date: Jun. 26, 1996

[87] PCT Pub. No.: WO95/18166

PCT Pub. Date: Jul. 6, 1995

[51] Int. Cl.⁶ .............................. C08L 63/00; C08F 20/00
[52] U.S. Cl. ........................... 523/400; 525/438; 525/530; 525/533; 428/413
[58] Field of Search .................... 525/438, 530, 525/533; 523/400; 428/413

[56] References Cited

U.S. PATENT DOCUMENTS

| | | | |
|---|---|---|---|
| 4,102,851 | 7/1978 | Luck et al. | 260/37 |
| 4,754,015 | 6/1988 | Thorsted, Jr. | 528/94 |
| 4,755,581 | 7/1988 | Blackburn et al. | 528/93 |
| 5,017,435 | 5/1991 | Barsotti et al. | 428/502 |
| 5,412,039 | 5/1995 | Barsotti et al. | 525/309 |
| 5,428,082 | 6/1995 | Gould et al. | 525/329.7 |
| 5,466,752 | 11/1995 | Barsotti et al. | 525/309 |
| 5,582,922 | 12/1996 | Barsotti et al. | 525/327.3 |

FOREIGN PATENT DOCUMENTS

| | | |
|---|---|---|
| 2091265 | 5/1993 | Canada. |
| 0 053 280 | 6/1982 | European Pat. Off.. |
| 0 257 512 | 3/1988 | European Pat. Off.. |
| 0 257 513 | 3/1988 | European Pat. Off.. |
| 0 275 138 | 7/1988 | European Pat. Off.. |
| 2 268 041 | 4/1975 | France. |
| 1 467 722 | 3/1977 | Netherlands. |

*Primary Examiner*—Randy Gulakowski

[57] ABSTRACT

A mar-resistant coating comprising an organic solvent and a binder having, in combination, (a) a low molecular weight anhydride resin with pendant non-cyclic anhydride moieties, (b) a linear anhydride, (c) an epoxy resin and (d) a catalyst, in which (b) has the formula

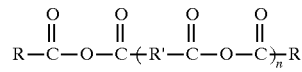

wherein R is a monovalent hydrocarbon group having 1 to 50 carbon atoms, R' is independently selected from bivalent hydrocarbon groups having 2 to 50 carbon atoms R and R' optionally containing an ether linkage, urethane linkage or ester linkage, and n is an integer of 1 to 500.

9 Claims, No Drawings

MAR-RESISTANT COATING

BACKGROUND OF THE INVENTION

The present invention relates to a curable coating composition particularly useful as a top coat in multi-layered coating systems.

Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coating had suggested the use of anhydride resins having pendant non-cyclic anhydride moieties in combination with resins that react with the polyanhydride resins to cure under curing conditions. See U.S. Pat. No. 5,428,082. However, a continuing need exists for coating formulations which provides outstanding performance characteristics after application, and particularly resistance to environmental etching.

Moreover, effort has previously been directly toward the development of mar-resistant clear coatings. While such coatings have previously been prepared, the mar-resistance was attained by softening the coating, which depreciates other performance characteristics.

SUMMARY OF THE INVENTION

The present invention provides a sprayable coating composition which, through the selection of the chemical makeup and molecular weight of the components, provides a fully formulated coating composition which, at a low VOC, can be easily applied, and exhibits outstanding appearance and durability after application and ease of maintenance. In addition, the present coating, when applied to a substrate, exhibits excellent mar-resistance at high hardness, as well as the ability to "heal" mars by heat and solvent treatment.

Specifically, the instant invention provides a curable coating composition comprising organic solvent and binder comprising (a) at least about 10%, on the basis of components (a) and (b), of an anhydride resin having a molecular weight of less than about 2000 that contains (1) a central moiety, and (2) on average, at least three pendant, non-cyclic anhydride moieties bonded to each central moiety;

(b) at least about 10%, on the basis of components (a) and (b), of a compound having at least two noncyclic acid anhydride groups and represented by the following formula

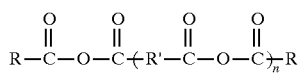

wherein R is a monovalent hydrocarbon group having 1 to 50 carbon atoms, R' is independently selected from a bivalent hydrocarbon groups having 2 to 50 carbon atoms, the hydrocarbon groups R and R' containing or not containing an ether linkage, urethane linkage or ester linkage, and n is an integer of 1 to 500.

(c) at least one organic component having at least 2 epoxy groups and;

(d) a functional amount of at least one catalyst, wherein the ratio of equivalents of epoxy to anhydride is about from 0.7 to 1.4.

This invention also concerns a composition as described above wherein the epoxy component is the diglycidyl ester of 1,2-cyclohexane dicarboxylic acid; and wherein R and R' in the linear anhydride (b) are both aliphatic moieties having up to 12 carbon atoms and n is an integer of 1–20; and wherein R in the linear anhydride has 8 carbon atoms and R' is a 50% molar blend of aliphatic hydrocarbon groups having four and seven carbon atoms, respectively, and n is 10; and a composition as above further comprising from 1 to 200 parts by weight, per 100 parts of components (a) and (b), of pigment; and such composition applied to a substrate.

DETAILED DESCRIPTION OF THE INVENTION

A first class of anhydride resin which can be used in the present invention includes those having a molecular weight of less than about 2000 having a central moieties and more than one pendant, non-cyclic anhydride moiety bonded to each central moiety. This anhydride resin, having pendant, non-cyclic anhydride moiety should comprise at least about 10% of the mixture of this anhydride and the liner anhydride. This first anhydride is asymmetrical, and preferably contains a moiety represented by the following formula:

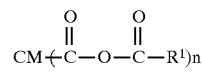

wherein (CM) is a central moiety, ($R^1$) is an organic moiety, and n is a number of pendant anhydride groups that average at least 3.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylolpropane and the dimer of trimethylolpropane. The multifunctional alcohols are reacted with cyclic, monomeric anhydride such as methyl hexahydrophthlic anhydride to give a multifunctional acid containing moiety. The resulting product is then reacted with ketene to form the linear pendant anhydride.

The central moiety is linked to at least about 3 non-cyclic anhydride groups on average. The anhydride equivalent weight (formula weight per anhydride group) is preferably at least about 200 and preferably no more than about 1000.

Each anhydride moiety is typically terminated by an organic group ($R^1$). This group is preferably aliphatic and more preferably alkly. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

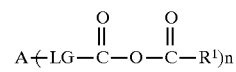

The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so that the anhydride is represented by the formula:

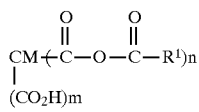

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin is an important feature of the present invention, and should be less than about 2000. At molecular weights of the oligomeric anhydride greater than 2000, it is difficult to attain a sprayable composition with a volatile organic content of less than about 3.8 pounds of organic solvent per gallon of curable compositions. The molecular weight of the anhydride resin is preferably about from 400 to 1,000, and the anhydride resin preferably has 3 to 4 pendant, non-cyclic anhydride moieties bonded to each central moiety.

The compositions of the present invention further comprise at least about 10%, on the basis of claimed components (a) and (b), of at least one linear anhydride oligomer.

Such linear anhydrides which can be used in the present invention comprise a compound having at least two non-cyclic acid anhydride groups and represented by the following formula

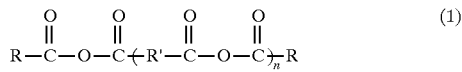

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500.

The above compounds can be prepared, for example, by reacting a monocarboxylic acid having one carboxyl group in the molecule with a dicarboxylic acid having two carboxyl groups in the molecule for dehydration.

Examples of monocarboxylic acids which can be used are benzoic acid, methylbenzoic acid, p-tert-butylbenzoic acid and like aromatic monocarboxylic acids; formic acid, acetic acid, propionic acid, butyric acid, caproic acid, caprylic acid, pelargonic acid, isononanoic acid, capric acid, undecanoic acid, lauric acid, myristic acid, palmitic acid, stearic acid, cyclohexanecarboxylic acid, 9-decanoic acid, oleic acid, eleostearic acid, elaidic acid, brassidic acid, linoleic acid, linolenic acid and like saturated or unsaturated aliphatic monocarboxylic acids or alicylic monocarboxylic acids; etc. Also usable as monocarboxylic acids are coconut oil fatty acid, soybean oil fatty acid, castor oil fatty acid, dehydrated castor oil fatty acid, linseed oil fatty acid, safflower oil fatty acid and the like. These examples can be used singly or in combination.

Examples of dicarboxylic acids which can be used are terephthalic acid, isophthalic acid, phthalic acid, naphthalenedicarboxylic acid, 4,4'-biphenyldicarboxylic acid, diphenylmethane-4,4'-dicarboxylic acid and like aromatic dicarboxylic acids; hexahydrophthalic acid and like alicyclic dicarboxylic acids; adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid, dimer acid and like aliphatic dicarboxylic acids; etc. One of these acids is usable, or at least two of them can be used in combination.

Among these dicarboxylic acids, those wherein the carboxylic groups are attached to adjacent carbon atoms readily undergo a self-cyclization reaction and encounter difficulty in giving the desired crosslinking agent, so that it is desirable not to use them singly. Such dicarboxylic acids are phthalic acid, hexahydrophtalic acid, tetrahydrophthalic acid, succinic acid, maleic acid, chloromaleic acid, etc.

The dehydration reaction between the two components can be conducted at about 80° to about 200° C. To promote this reaction, it is desirable to use a dehydrating agent such as acetic anhydride, acetic acid chloride or phosphorus pentoxide. Although not limited specifically, the amount of the agent to be used is preferably about 2 to about 200 parts by weight per 100 parts by weight of the combined amount of the two components calculated as solids. The reaction ratio of the two components is variable within a range permitting no free carboxyl group to remain in the product as represented by the formula (I). Stated specifically, it is desirable to use about 0.5 to about 250 moles of the dicarboxylic acid per mole of the monocarboxylic acid.

Further, some or all of the carboxylic groups the two components may be converted, for example, to an acid chloride, alkali metal salt or amine salt (primary, secondary, tertiary or quaternary, followed by a desalting reaction to from acid anhydride groups.

With reference to the formula (I), R and R' are each hydrocarbon groups which R has 1 to 50 carbon atoms and R' has 2 to 50 carbon atoms and which may contain an ether linkage, urethane linkage or ester linkage. The hydrocarbon group is introduced into the compound (I) by using the monocarboxylic acid and dicarboxylic acid.

An ether linkage can be introduced into R', for example, by converting the hydroxyl groups at the respective ends of a dihydric alcohol as (poly)etherified to carboxyl groups as by oxidation to obtain a dicarboxylic acid polyether having one carboxyl group at each end, and substituting the polyether for a portion or the whole of the dicarboxylic acid or a modified product thereof. On the other hand, an ether linkage is introduced into R, for example, by converting only one hydroxyl group of the (poly)etherified dihydric alcohol to a carboxyl group, with a monohydric alcohol etherified with the other hydroxyl group, to obtain a monocarboxylic acid containing an ether linkage, substituting this acid for a portion or the whole of the monocarboxylic acid to be used and conducting the same reaction as described above. The presence of the ether linkage results in the advantage that the product obtained on curing can be given high resistance to chemicals.

The dihydric alcohol to be (poly)etherified is a compound having two hydroxyl groups in the molecule. Examples of such alcohols are ethylene glycol, propylene glycol, diethylene glycol, trimethylene glycol, tetraethylene glycol, trimethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5- hexanediol, 1,4-cyclohexanedimethanol, neopentyl glycol, bisphenol A, etc. One of these alcohols is usable, or at least two of them can be used in combination The polyetherified product can be obtained by subjecting the dihydric alcohol and an alkylene oxide, such as ethylene oxide, propylene oxide or butylene oxide, to an addition reaction.

The monohydric alcohol to be used for forming the group R containing an ether linkage is a compound having one hydroxyl group in the molecule. Examples of such compounds are methyl alcohol, ethyl alcohol, propyl alcohol, butyl alcohol, ethyl butanol, benzl alcohol, lauryl alcohol, stearly alcohol, ethylene glycol monomethyl ether, ethylene glycol monoethyl ether, diethylene glycol monomethyl ether, diethylene glycol monoethyl ether, diethylene glycol monobutyl ether and the like. These compounds can be used singly, or in combination.

To introduce a urethane linkage into the group R or R' of the formula (I), a polyurethane having an isocyanate group at leach of opposite ends is used which is obtained by subjecting a diisocyanate compound and a dihydric alcohol to a urethanization reaction. More specifically, a urethane linkage can be introduced into the group R' by reacting a compound having aboth hydroxyl and carboxyl in the molecule with the two isocyanate groups of the polyurethane for urethanization to introduce a carboxyl group into each end, and substituting the resulting compound for a portion or the whole of the dicarboxylic acid. Further a urethane linkage can be introduced into the group R by adding monohydric alcohol to one of the isocyanate groups of the polyurethane, adding a compound having both hydroxyl and carboxyl in the molecule to the other isocyante group by a urethanization reaction to obtain a monocarboxylic acid, and substituting the acid for a portion or the whole of the monocarboxylic acid stated previously. The presence of the urethane linkage results in the advantage that the product obtained on curing has high hardness, elasticity and high resistance to water and to chemicals. The diisocyanate compound mentioned above is a compound having two isocyanate groups in the molecule. Exemplary of such compounds are hexamethylene diisocyanate, trimethylhexamethylene diisocyanate and like aliphatic compounds, hydrogenated xylylene diisocyanate, isophorone diisocyanate, cyclohexane diisocyanate and like alicyclic compound, tolylene diisocyanate diphenylmethane diisocyanate and like aromatic compounds. Examples of compounds having both hydroxyl and carboxyl are lactic acid, p-hydroxybenzoic acid, dimethylolpropionic acid, hydroxpivalic acid, ricinoleic acid, 12-hydroxystearic acid, etc. Examples of dihydric alcohols and monohydric alcohols usable are those already mentioned.

An ester linkage can be readily introduced into the group R or R' of the formula (I), for example, by subjecting a monocarboxylic acid having one carboxylic group in the molecule and a low-molecular-weight polyester having two carboxyl groups in the molecule to a dehydration reaction. The presence of an ester linkage entails the advantage of giving a noncrystalline compound which is highly compatible with other resins, permitting the resulting composition to form cured coatings of remarkably improved flexibility and elongation.

Examples of monocarboxylic acids useful for the reaction are aliphatic monocarboxylic acids, alicyclic monocarboxylic acids, coconut oil fatty acid, etc. previously mentioned. Also usable are adducts of a monohydric alcohol with a cyclic acid anhydride. Among these, benzoic acid, isononanoic acid, coconut oil fatty acid and the like are desirable to use.

The low-molecular-weight polyester (up to about 2000, preferably 150 to 1000, in number average molecular weight) having two carboxyl groups in the molecule can be easily prepared, for example, from a dicarboxylic acid and a glycol. Preferred polyesters are those invaiably having carboxyl groups and an ester linkage in the molecule and free from other functional groups and linkages.

The dicarboxylic acid to be used in this case is a compound having two carboxyl groups in the molecule or an acid anhydride thereof. Examples of such acids include those previously mentioned, i.e., aromatic dicarboxylic acids or acid anhydrides thereof; alicyclic dicarboxylic acids or acid anhydrides thereof; and aliphatic dicarboxylic acids or acid anhydrides thereof. Among these, preferable to use is one selected from among phthalic anhydride, methyl hexahydro phthalic anhydride, adipic acid, succinic acid, sebacic acid, etc.

The glycol to be used in this case is a compound having two hydroxyl groups in the molecule. Examples of such compounds are the dihydric alcohols previously mentioned. Among these, preferable to use is one selected from amound neopentyl glycol, 1,6-hexanediol, 1,4-butanediol, etc.

The esterification reaction between the dicarboxylic acid and the glycol can be carried out by a known process. The reaction ration of the two components is variable within such a range that the resulting polyester has two carboxyl groups in total at the respective ends of side chains. More specifically, it is suitable to sue about 1.2 to about 2 moles of dicarboxylic acid per mole of glycol.

Instead of using the dicarboxylic acid and the glycol for preparing the low-moleculer-weight polyester, it is also possible to use a lactone, such as ε-caprolactone, and the above-mentioned compound having both hydroxyl and carboxyl.

The formula (I) wherein an ester linkage is introduced into R or R' is prepared by subjecting the monocarboxylic acid stated above and the polyester having two carboxyl groups in the molecule to a dehydration reaction. This dehydration reaction can be conducted at about 80° to about 300° C. To promote this reaction, it is desirable to use a dehydrating agent such as acetic anhydride, acetic acid chloride or phosphorus pentoxide. The amount of the agent to be used, although not limited specifically, is preferably about 2 to about 200 parts by weight per 100 parts by weight of the combined amount of the two components calculated as solids. The reaction ration between the two components is in such a range that no free carboxyl group remains in the resulting product as shown in the formula (I). More specifically, it is desired to use about 0.5 to about 250 moles of the polyester having two carboxyl groups per mole of the monocarboxylic acid. Also in this case, some or all of the carboxyl groups of the two components may be converted, for example, to an acid chloride, alkali metal salt or amine salt (primary, secondary, tertiary or quaternary), followed by a desalting reaction to prepare acid anhydride groups.

The linear anhydride has noncyclic acid anhydride groups and a number average molecular weight which is preferably about 100 to about 50,000, more preferably in the range of 500 to 10,000, altough not limited specifically, the number of acid anydride groups in the molecule is at least two, more preferably about 2 to about 50, to be suitable.

The present coating composition further comprise an organic component having at lest two epoxy groups. In this context a wide variety of materials can be used. Typical of such epoxy components are sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanurates, such as "Denecol" EX301 from Nagase. Sorbitol polyglycidyl ether, such as DCE-358® from Dixie Chemical, and di- and polyglycidyl esters of acids, such as Araldite CY-184® from Ciba-Geigy or XU71950 from Dow, are preferred since they form high quality finishes. Polymeric epoxy resins can also be used, such as those containing glycidyl methacrylate or glycidyl acrylate. The epoxy resin can further comprise copolymerized monomers of alkyl methacrylates, or alkyl acrylates or mixtures thereof, where the alkyl groups have 1–12 carton atoms. Optionally, the acrylic polymer can contain other components such as styrene, alphamethyl styrene, acrylonitrile, methacrylonitrile in amounts of about 0.1–50% by weight.

The quantities of the anhydride components as well as the epoxy components should be such that the ratio of equivalents of epoxy to anhydride is about from 0.7 to 1.4.

The present coating composition further comprise a functional amount of catalyst. A wide variety of catalysts can be used, including both active and latent catalysts. A latent catalyst is understood to mean a catalyst which has little or no effect on the ingredients with which it is blended at ambient or storage conditions, but which promotes the reaction of these components at elevated temperatures or when applied to a substrate. While a wide variety of such catalysts can be used, as will be evident to those skilled in the art, those found to be particularly satisfactory in the present invention include onium compounds such as those selected from the group consisting of quaternary phosphonium compounds, quaternary ammonium compounds and tertiary amines blocked with acids such as sulfonic acid and phosphoric acid. Catalysts which have been found particularly satisfactory include quaternary phosphonium salts such as tetrabutylphosphonium chloride or quaternary ammonium salts such as tetrabutylammonium halide, especially chloride.

Active catalysts which can be used in the present invention include tertiary amines catalysts of the type previously used in coating formulation, such as triethylenediamine or Bis(2-dimethylaminoethyl)ether.

A functional amount of catalyst is used in the present formulations, which will vary widely, depending on the specific anhydride resins and epoxy resins selected, as well as their molecular weight and relative proportions. While the specific concentration of catalysts will be selected in view of these variables, as will be evident to those skilled in the art, the quantities will generally be about from 0.1 to 5 wt %, based on the weight of the solids in the formulation.

The coating compositions of the present invention are formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by conventional techniques such as spraying electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions.

After application to a substrate, the present compositions are cured by heating to a temperature of about from 120° to 140° C. for a period of about from 15 to 90 minutes.

The performance characteristics of the final cured coating composition are excellent, providing a combination of excellent gloss and durability to abrasion, sunlight and acidic rain. The cured coating compositions exhibit an excellent balance of hardness and mar-resistance. The coatings also exhibit the ability to "heal" mars by heat and solvent wiping. At the same time, the compositions provide ease of handling and low volatile organic content.

The present invention is further illustrated by the following specific examples, in which parts and percentages are by weight unless otherwise indicated.

EXAMPLE 1

A curable coating composition was prepared from an anhydride resin having pendant, non-cyclic anhydride moieties, a linear anhydride, co-reactant epoxy and catalyst.

(a) Anhydride Resin With Pendant Groups

The anhydride resin was prepared from a tetra-functional half-acid ester. The following constituents were charged to a reaction vessel equipped with a heating mantle, reflux condenser, thermometer, nitrogen inlet, and stirrer:

|  | Parts by Weight |
| --- | --- |
| Portion 1 |  |
| Pentaerythritol | 478.0 |
| Methyl hexahydrophthalic anhydride | 2250.0 |
| Triethylamine | 0.5 |
| Portion 2 |  |
| Xylol (135-145C) | 2250.0 |
| Total | 4978.5 |

Portion 1 was charged into the reaction vessel, heated to 180° C. under a nitrogen blanket and heal for 30 minutes. After the hold period, the reaction mixture was cooled and Portion 2 added.

The solution prepared above was used to make a linear pendant anhydride. The solution was charged into a 5L flask equipped with a stirrer and a gas inlet tube. The gas inlet tube was attached to a ketene generator similar to the one described by Williams et al. in the Journal of Organic Chemistry 5,122,1940. Ketene is bubbled through the solution until all of the acid groups have been converted to anhydride groups. Reaction progress was monitored via FTIR. Solvent was then removed under vacuum to give a linear pendant anhydride with the following characteristics;

% weight solids: 78.0

Anhydride eq. wt: 329+/−4 (on solution basis)

Acid eq. wt: 6167+/−1323 (on solution basis)

(b) Linear Anhydride

A crosslinking agent was prepare by mixing together 5 moles of adipic acid, 5 moles of azeleic acid, 2 moles of isononanoic acid, and 24 moles of acetic anhydride, reacting the monomers at 140° C. while removing acetic acid as a by-product, heating the mixture to 160° C. when acetic acid ceased flowing out and removing an excess of acetic anhydride to terminate the reaction. The resulting linear anhydride was dissolved in propylene glycol monomethyl ether acetate at a concentration of 80% by weight.

A coating formulation was prepared by first combining 76.31 parts of linear pendant anhydride (a) and 124.1 parts of linear anhydride (b). Catalyst was added to the anhydride blend as 5.99 parts of a 25% solution of tetrabutylphosphoniumchloride in PM acetate; and 18.77 parts of a 25% solution of tertiary amine catalysts commercially available from Union Carbide as NIAX A-99 methyl ethyl ketone. In addition, 20.5 parts of a 5% solution in PM acetate of silicone flow additive commercially available from BYK Chemie as BYK 301, 6.06 parts of Tinuvin 384 UV screener from Ciba Giegy and 4.54 parts of Tinuvin 292 hindered amine light stabilizer from Ciba were added to the formulation. This formulation was combined with 143.7 parts of Diglycidyl ester commercially available from Dow as XU-71950.

This clear was reduced to a viscosity of Fisher #2 of 48 seconds with butyl acetate. It was sprayed over a waterborne basecoat which has received a warm air flash to remove water. The system was baked for 30 minutes at 265° F. The resulting finish and excellent appearance and cure. The balance of hardness and mar resistance was excellent, as was the solvent resistance. Resistance to acid etching was also good. The VOC of this clear less than or equal to 2.8 lbs/gal.

We claim:

1. A curable coating composition comprising organic solvent and binder comprising
   (a) 20–80%, on the basis of components (a) and (b), of an anhydride resin having a weight average molecular weight of less than about 2000 that contains (1) a central moiety, and (2) three to four pendant, non-cyclic anhydride moieties bonded to each central moiety;
   (b) 80-20%, on the basis of components (a) and (b), of a compound having at least two non-cyclic acid anhydride groups and represented by the following formula

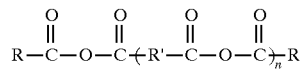

wherein R is a monovalent hydrocarbon group having 1 to 50 carbon atoms, R' is independently selected from bivalent hydrocarbon groups having 2 to 50 carbon atoms, R and R' optionally containing an ether linkage, urethane linkage or ester linkage, and n is an integer of 2–100;
   (c) at least one organic component having at least two epoxy groups and;
   (d) a functional amount of at least one catalyst, wherein the ratio of equivalents of epoxy to anhydride is from 0.7 to 1.4.

2. A composition of claim 1 wherein the anhydride resin consists essentially of the reaction produce of ketene with the reaction product of pentaerythritol, and methyl hexahydrophthalic anhydride.

3. A composition of claim 1 wherein the catalyst is selected from at least one compound of the group consisting of quaternary phosphonium compounds, quaternary ammonium compounds and tertiary amines.

4. A composition of claim 1 wherein organic component (c) is an acrylic resin having at least two glycidyl methacrylate groups.

5. A composition of claim 1 wherein the epoxy component is the diglycidyl ester of 1,2-cyclohexane dicarboxylic acid.

6. A composition of claim 1 wherein R and R' in the linear anhydride (b) are both aliphatic moieties having up to 12 carbon atoms and n is an integer of 2–20.

7. A composition of claim 6 wherein R in the linear anhydride has 8 carbon atoms and R' is a 50% molar blend of aliphatic hydrocarbon groups having four and seven carbon atoms, respectively, and n is 10.

8. A curable coating composition of claim 1 further comprising from 1 to 200 parts by weight, per 100 parts of components (a) and (b), of pigment.

9. A curable coating composition of claim 1 applied to a substrate.

* * * * *